(12) United States Patent
Kim et al.

(10) Patent No.: US 10,937,330 B2
(45) Date of Patent: Mar. 2, 2021

(54) METHOD, SYSTEM, AND COMPUTER-READABLE RECORDING MEDIUM FOR PROVIDING EDUCATION SERVICE BASED ON KNOWLEDGE UNITS

(71) Applicant: KNOWRE KOREA INC., Seoul (KR)

(72) Inventors: Yong Jae Kim, Seoul (KR); Seo Joon Kim, Seoul (KR); Jong Ho Shin, Daegu (KR); Seung Yun Cho, Seoul (KR)

(73) Assignee: KNOWRE KOREA INC., Seoul (KR)

( * ) Notice: Subject to any disclaimer, the term of this patent is extended or adjusted under 35 U.S.C. 154(b) by 0 days.

(21) Appl. No.: 14/588,067

(22) Filed: Dec. 31, 2014

(65) Prior Publication Data
US 2015/0111191 A1 Apr. 23, 2015

Related U.S. Application Data

(63) Continuation of application No. 13/989,772, filed as application No. PCT/KR2013/001349 on Feb. 20, 2013, now abandoned.

(30) Foreign Application Priority Data

Feb. 20, 2012 (KR) ........................ 10-2012-0016748

(51) Int. Cl.
*G09B 7/04* (2006.01)
*G09B 7/02* (2006.01)
*G06Q 50/20* (2012.01)
*G09B 7/00* (2006.01)

(52) U.S. Cl.
CPC ............. *G09B 7/04* (2013.01); *G06Q 50/205* (2013.01); *G09B 7/00* (2013.01); *G09B 7/02* (2013.01)

(58) Field of Classification Search
CPC .................................... G09B 7/00; G09B 7/02
USPC ........................................................... 434/322
See application file for complete search history.

(56) References Cited

U.S. PATENT DOCUMENTS

| | | | |
|---|---|---|---|
| 8,699,941 B1* | 4/2014 | Holt ........................ | G09B 7/02 434/362 |
| 2003/0039948 A1* | 2/2003 | Donahue ...................... | 434/322 |
| 2003/0129574 A1* | 7/2003 | Ferriol ..................... | G09B 5/00 434/362 |
| 2006/0099563 A1* | 5/2006 | Liu ........................ | G09B 7/02 434/350 |
| 2008/0286737 A1* | 11/2008 | Cheng et al. ................ | 434/322 |
| 2009/0035733 A1* | 2/2009 | Meitar et al. ................ | 434/118 |
| 2009/0111085 A1* | 4/2009 | Rudy ...................... | G09B 7/00 434/353 |
| 2010/0035225 A1* | 2/2010 | Kerfoot, III .................. | 434/335 |
| 2011/0065082 A1* | 3/2011 | Gal et al. ..................... | 434/365 |
| 2011/0151425 A1* | 6/2011 | Smith et al. .................. | 434/350 |
| 2012/0214147 A1* | 8/2012 | Ernst et al. ................... | 434/353 |
| 2012/0244507 A1* | 9/2012 | Tu et al. ....................... | 434/362 |
| 2013/0266916 A1* | 10/2013 | Weems .................... | G09B 5/02 434/188 |

* cited by examiner

*Primary Examiner* — Thomas J Hong
(74) *Attorney, Agent, or Firm* — Dinsmore & Shohl LLP; Yongsok Choi, Esq.

(57) ABSTRACT

A method for providing education service based on knowledge units includes generating a curriculum based on a user's achievement for at least one knowledge unit when the curriculum includes at least one problem composed based on the at least one knowledge unit, and providing the at least one problem to the user.

18 Claims, 22 Drawing Sheets

```
1    <?php
2
3    function Solve_Quadratic_Equation_By_Perfect_Square_Expression ($A)
4    {
5
6    variable('V1',$A,$defA, 'Quadratic_Equation_Factorizable');
7
8    //filtering
9    if (passcall('Discriminate_Quadratic_Equation_With_One_Unknown',$A) = FALSE)
10       terminate();
11
12   $A = passcall('Find_Unknown_Of_Equation',$A);
13   $B = $A->unknown[0];
14   sysout ('V1a', $B);
15
16   //solution
17   //step1. Turn V1 into Quadratic Equation in Perfect Square Expression.
18   $newA = call ('T1', 'Turn_Quadratic_Equation_Into_Perfect_Square_Expression',$A);
19   sysout ('V2',$newA);
20
21   //step2. Solve Equation by Replacing Base of Square Expression.
22      //Finding Base of Square Expression.
23   $lhs = $newA->lhs;
24   if (type($lhs) = 'MulChain') {
25       $temp = $lhs->terms[sizeof ($lhs->terms)-1][1];
26   }
27   else
28           $temp = $lhs;
29   $base = $temp->base; // Base of Square Expression.
30      //Replace Base if not equal to Symbol.
31   if (type($base) != 'Symbol') {
32           $newA = call('Replace',$newA,$base,new Symbol('X'));
33           $newA->unknown = array(new Symbol('X'));
34
35           $repl_inf = new Equation(new Symbol('X'), $base);
36   }
37   else {
38           $newA->unknown = array($B);
39           $repl_inf = null;
40   }
41   sysout('V5',$newA);
42      //Solving Quadratic Equation in Square Expression.
43   $eq = call('Solve_Quadratic_Equation_By_Square_Expression',$newA);
44   sysout('V6', $eq);
45
46   //step5. After Substituting Replaced Value, Solve Again for Given Letter.
47      //Substituting Replaced Value.
48   if ($repl_inf != null)
49       $eq = call('Substitution Calculation'
50   ,$eq,$repl_inf->lhs,$repl_inf->rhs);
51   $result = array();
52   foreach($eq as $v) {
53           $v->unknown = array ($B);
54           $result[] = call('Solve_Linear_Equation_With_One_Unknown',$v,TRUE);
55   }
56   sysout ('VR',$result);
57   return $result;
58   }
59
60   ?>
```

METHOD, SYSTEM, AND COMPUTER-READABLE RECORDING MEDIUM FOR PROVIDING EDUCATION SERVICE BASED ON KNOWLEDGE UNITS

PRIORITY

The present application is a continuation of the U.S. patent application Ser. No. 13/989,772, filed on May 24, 2013, which claims priority under 35 U.S.C. § 371 to PCT Application PCT/KR2013/001349, filed on Feb. 20, 2013, and to Korean Patent Application No. 10-2012-0016748, filed on Feb. 20, 2012, the disclosures of which are hereby incorporated by reference in their entireties.

FIELD OF THE INVENTION

The present invention relates to a method, a system, and a computer-readable recording medium for providing education service based on knowledge units.

BACKGROUND

Conventionally, various kinds of education services have been provided online or offline. In many cases, such education services were associated with the techniques for electronically providing education contents to digital device users. However, these conventional education services have merely focused on providing standardized customary education contents such as problems, correct answers, general explanations on solutions, and so on, while electronic techniques or ideas remained no more than subsidiary means.

The present inventor(s) have developed techniques for improving such issues in prior art for years, and have disclosed the structural and effectual characteristics thereof in Korean Patent Application No. 2009-36153 (the specification of the aforementioned application is incorporated herein by reference in its entirety.)

The present inventor(s) now suggest techniques for providing education service based on knowledge units through the specification of the present application, which significantly improve the above-identified issues in prior art.

SUMMARY OF THE INVENTION

The present invention is to resolve the above prior art issues.

It is an objective of the present invention to provide a new form of education service based on knowledge units.

It is another objective of the present invention to identify knowledge units for which a user has shown insufficient achievement to enable the user's learning about the knowledge units.

It is yet another objective of the present invention to organize a plurality of knowledge units into a form of knowledge chain or matrix to advantageously make use of the knowledge units.

The representative aspects of the present invention to achieve the above objectives are described below.

According to one aspect of the present invention, a method for providing education service based on knowledge units includes the steps of (a) generating a curriculum based on a user's achievement for at least one knowledge unit, the curriculum includes at least one problem and the at least one problem is composed based on the at least one knowledge unit, and (b) providing the at least one problem to the user.

In addition, another method or a system to implement the present invention, as well as a computer-readable recording medium having stored thereon a computer program to perform the aforementioned method is further provided.

According to the present invention, a new form of education service can be provided based on knowledge units.

According to the present invention, the knowledge units for which a user has shown insufficient achievement can be identified to enable the user's learning about the knowledge units.

According to the present invention, a plurality of knowledge units can be organized into a form of knowledge chain or matrix to advantageously make use of the knowledge units.

BRIEF DESCRIPTION OF THE DRAWINGS

FIGS. 2a to 2c are diagrams to facilitate understanding of the knowledge units and knowledge chains of the present invention;

FIG. 4 illustrates a graphic user interface according to one embodiment of the present invention;

FIGS. 6a to 6l are textual representations illustrating exemplary knowledge chains of mathematics or science courses and their corresponding knowledge units, problems, explanations on individual solution steps, or the like.

DETAILED DESCRIPTION OF THE INVENTION

Figure 1:
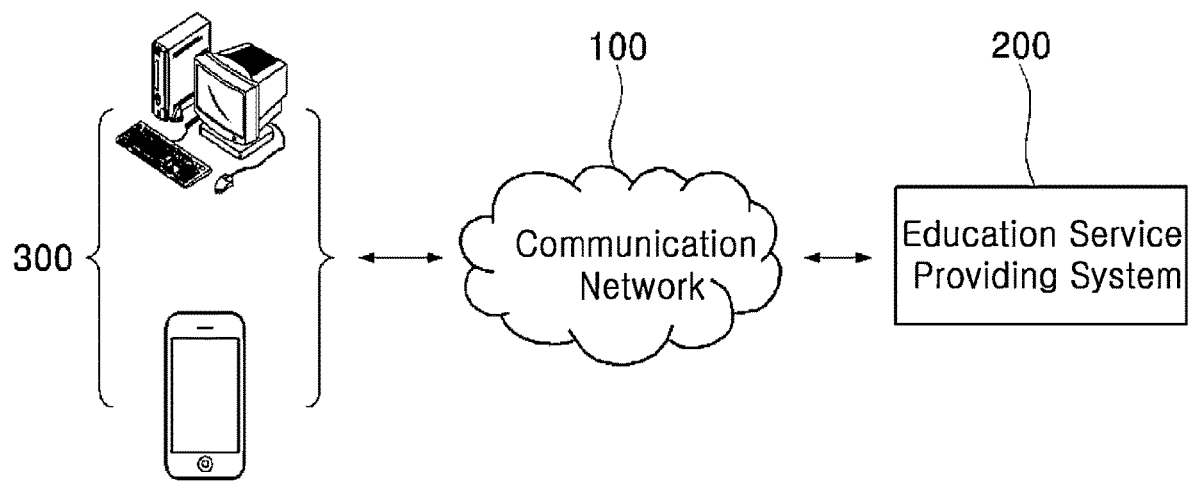
FIG. 1 is a schematic diagram of the structure of an entire system for providing education service according to one embodiment of the present invention.

In the following detailed description of the present invention, reference is made to the accompanying drawings that show, by way of illustration, specific embodiments in which the present invention may be practiced. These embodiments are described in sufficient detail to enable those skilled in the art to practice the present invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention encompasses the entire subject matter covered by the appended claims and the full range of equivalents to which the claims are entitled. In the drawings, like reference numerals refer to the same or similar elements throughout the several views.

Hereinafter, various preferred embodiments of the present invention will be described below in detail with reference to the accompanying drawings such that those skilled in the art to which the present invention pertains can easily practice the present invention.

PREFERRED EMBODIMENTS OF THE INVENTION

In the following description, the term "content" or "contents" denotes digital information or individual information elements comprised of text, symbol, voice, sound, image, video, or the like, which are accessible via communication networks. For example, such content may comprise data such as text, image, video, audio, and links (e.g., web links) or a combination of at least two types of such data.

Structure of Entire System

FIG. 1 is a schematic diagram of the structure of an entire system for providing education service according to one embodiment of the present invention.

As shown in FIG. 1, the entire system according to one embodiment of the present invention comprises a communication network 100, an education service providing system 200, and a user terminal device 300.

First, the communication network 100 according to one embodiment of the present invention may be implemented regardless of communication modality such as wired or wireless communication, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication 100 is not necessarily limited thereto, and may at least partially include known wired or wireless data communication networks, known telephone networks, or known wired or wireless television networks.

Next, the education service providing system 200 according to one embodiment of the present invention may provide education contents to the user terminal device 300 via the communication network 100, the contents including problems, correct answers, problem items of individual solution steps (i.e., sub-problems), correct answers to individual solution steps (i.e., correct answers to sub-problems), explanations on individual solution steps, hints on individual solution steps, knowledge units available for solutions (to be described below), and so on. In response, the education service providing system 200 may receive feedback (e.g., the user's answers to the problems or answers to the individual solution steps) on the user terminal device 300, if necessary. The education service providing system 200 may be a website server operating to provide education service on the web. In addition, user applications may be downloaded from the education service providing system 200 to the user terminal device 300.

The structure and function of the education service providing system 200 according to the present invention will be discussed in detail in the following description.

Next, the user terminal device 300 according to one embodiment of the present invention is a digital equipment capable of connecting to and communicating with the education service providing system 200, and may be any type of digital equipment having a microprocessor and memory means for computing capabilities, such as desktop computers, notebook computers, workstations, personal digital assistants (PDAs), web pads, and mobile phones.

The user terminal device 300 may include a web browser (not shown) to allow the user to receive contents from the education service providing system 200 and send feedback thereon to the education service providing system 200. The user terminal device 300 may further include the aforementioned user applications. In any case, a graphic user interface may be provided to the user.

Knowledge Units and Knowledge Chains

Figure 2A:
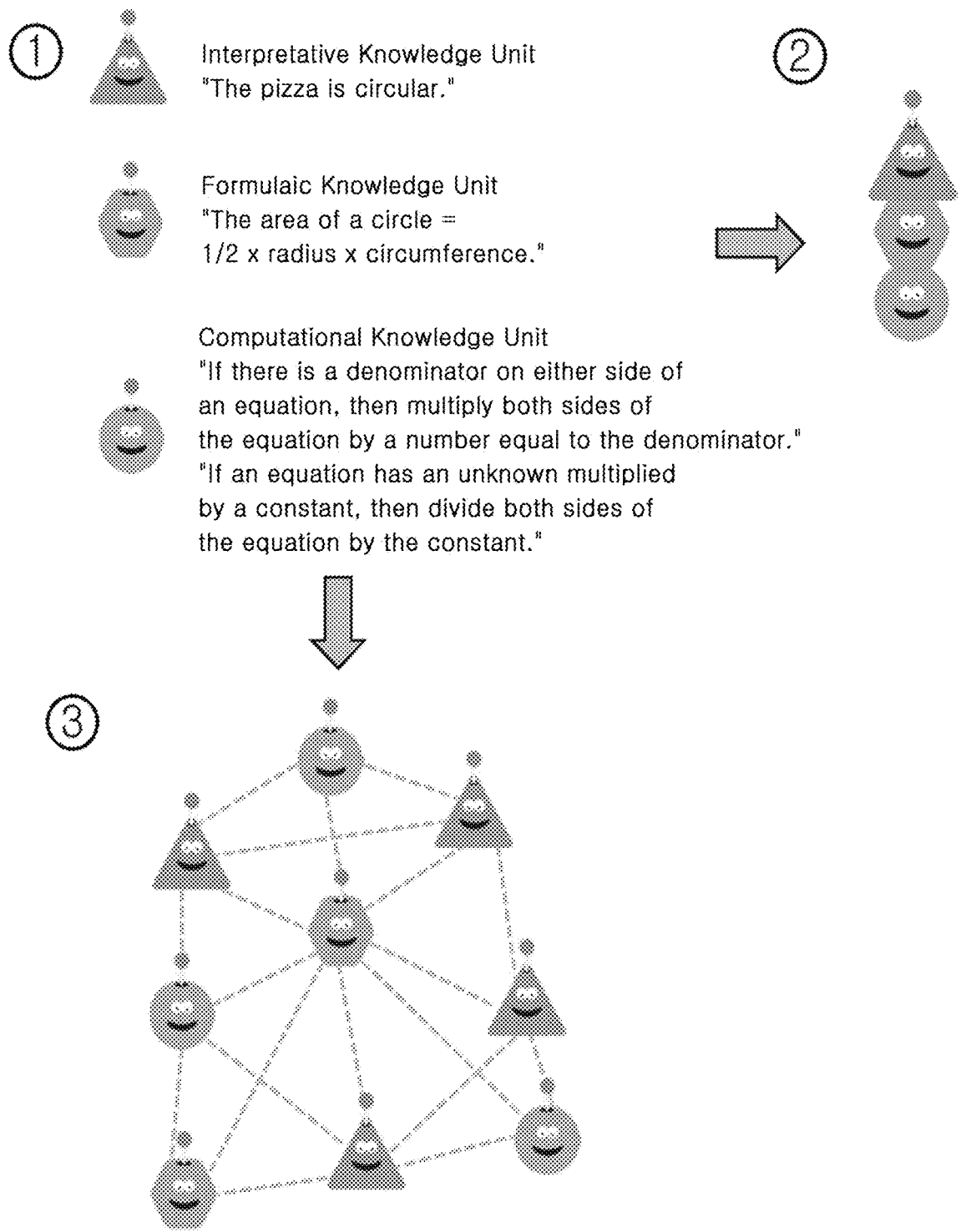
Figure 2B:
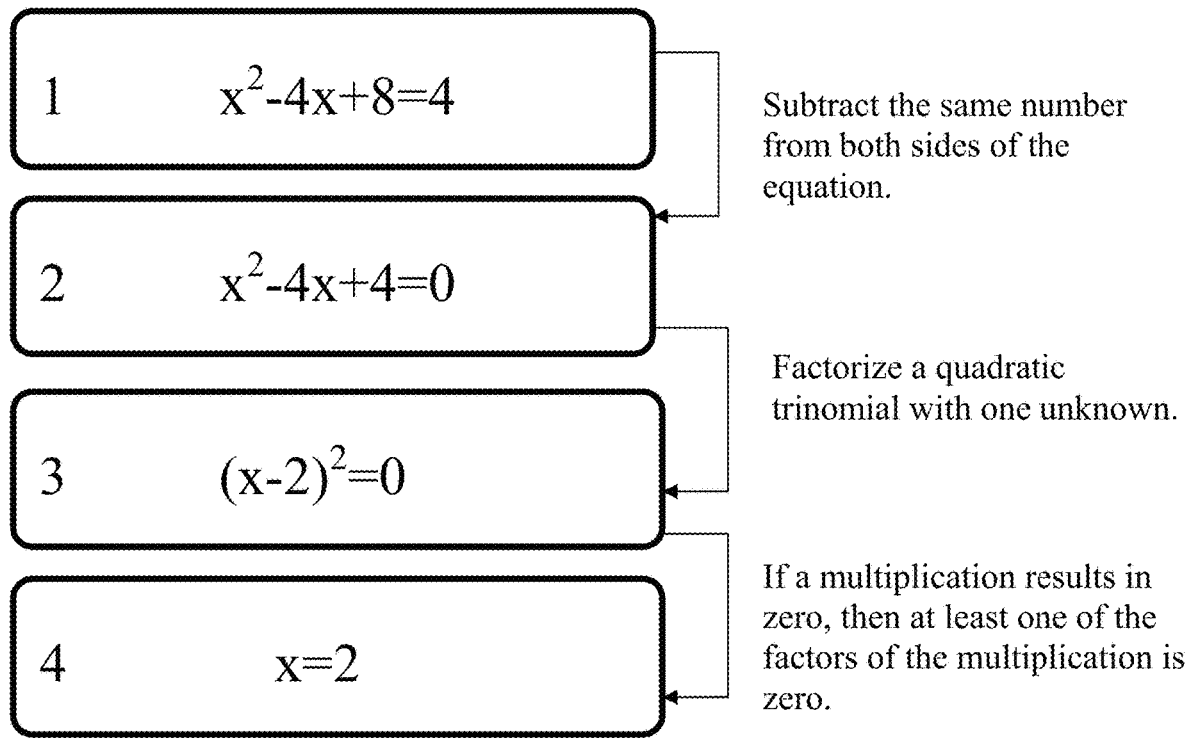

Prior to discussing the specific structure of the education service providing system 200 according to the present invention, the knowledge units and knowledge chains, which are the unique concepts of the present invention, will be described with reference to FIGS. 2a to 2c. FIGS. 2a to 2c are diagrams to facilitate understanding of the knowledge units and knowledge chains of the present invention.

According to the present invention, individual problems are composed on the basis of knowledge units, which are knowledge modules required to solve the problems. For example, in case of the problem, "Find the radius of a pizza with an area of 1,250 cm$^2$ and a circumference of 125 cm.," the knowledge unit may be an interpretative knowledge unit (e.g., "The pizza is circular."), a formulaic knowledge unit (e.g., "The area of a circle=½×radius×circumference."), or a computational knowledge unit (e.g., "If there is a denominator on either side of an equation, then multiply both sides of the equation by a number equal to the denominator." or "If an equation has an unknown multiplied by a constant, then divide both sides of the equation by the constant."), as illustrated in the first view of FIG. 2a.

As shown in the second view of FIG. 2a, at least one of such knowledge units may constitute a knowledge chain, which may be of a similar problem type. The knowledge chain may be a chunk of information that sequentially includes the identification information of the knowledge units constituting the knowledge chain.

Further, as shown in the third view of FIG. 2a, one knowledge unit may be solely used in one knowledge chain, while it may be usually used in a variety of knowledge chains. Therefore, the knowledge units that may constitute a knowledge chain together may be associated with each other and organized into the form of a matrix (three-dimensional in certain cases).

Further examples of the aforementioned knowledge units are given below. In case of the problem that is formulated as shown in FIG. 2b, the corresponding knowledge units may be "Subtract the same number from both sides of the equation." (1→2), "Factorize a quadratic trinomial with one unknown." (2→3), "If a multiplication results in zero, then at least one of the factors of the multiplication is zero." (3→4), or the like.

In addition, in order to further facilitate understanding of the knowledge units, an example of the actual program code for implementing a knowledge unit regarding factorization of a quadratic equation is illustrated in FIG. 2c.

Structure of Education Service Providing System

Hereinafter, the internal structure of the education service providing system 200 according to the present invention and the functions of its individual components will be described.

Figure 3:
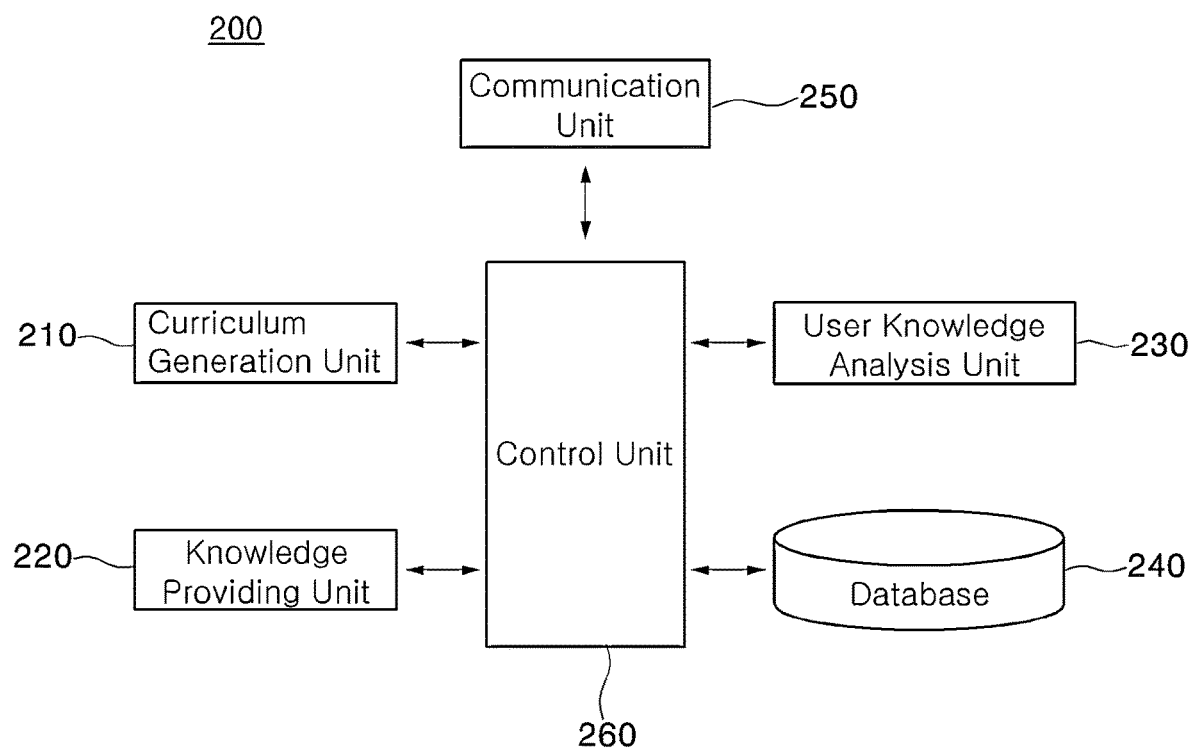
FIG. 3 is a detailed diagram of the internal structure of an education service providing system 200 according to one embodiment of the present invention.

FIG. 3 is a detailed diagram of the internal structure of the education service providing system 200 according to one embodiment of the present invention.

As shown in FIG. 3, the education service providing system 200 according to one embodiment of the present invention may comprise a curriculum generation unit 210, a knowledge providing unit 220, a user knowledge analysis unit 230, a database 240, a communication unit 250, and a control unit 260. According to one embodiment of the invention, at least some of the curriculum generation unit 210, the knowledge providing unit 220, the user knowledge analysis unit 230, the database 240, the communication unit 250 and the control unit 260 may be program modules that communicate with the user terminal device 300. Such program modules may be included in the education service providing system 200 in the form of operating systems, application modules, or other program modules, and may be physically stored in a variety of known storage devices. Further, such program modules may be stored in a remote storage device capable of communicating with the education service providing system 200. The program modules include, but are not limited to, routines, subroutines, programs, objects, components, data structures, and so on, to perform specific tasks or implement specific abstract data types according to the present invention, which are to be described below.

First, the curriculum generation unit 210 according to the present invention may receive information on the user's basic profile (e.g., information on the user's grade, learning courses, learning units, or the like) and collect information on the user's achievements for individual knowledge units, which may be identified by the knowledge analysis as will be described below.

Further, the curriculum generation unit 210 may generate a curriculum for the user. The curriculum may be a collection of problems that require understanding of at least one knowledge unit (these problems may be assigned the identification information of the corresponding knowledge units in the form of metadata), or a collection of problems that require understanding of a particular knowledge chain (these problems, which may be of a specific type, may be assigned the identification information of the corresponding knowledge chain in the form of metadata). Preferably, the curriculum generation unit 210 may generate a curriculum by selecting the problems composed based on the knowledge units for which the user has shown low achievement, as necessary, in consideration of the following: the information on the user's grade, learning courses, or learning units, together with the grade information, learning course information, or learning unit information of the knowledge units (to this end, the knowledge units may have been previously associated with the grade information, learning course information, or learning unit information by way of tagging or the like); the difficulty levels of the problems (in this case, the difficulty level may have been previously determined based on, for example, the average of the scores that other users have made on the corresponding problem, as in prior art); or the number of the knowledge units constituting the problem.

In addition, the curriculum generation unit 210 may manage the history of the curriculums that have been generated for the user.

Figure 4:
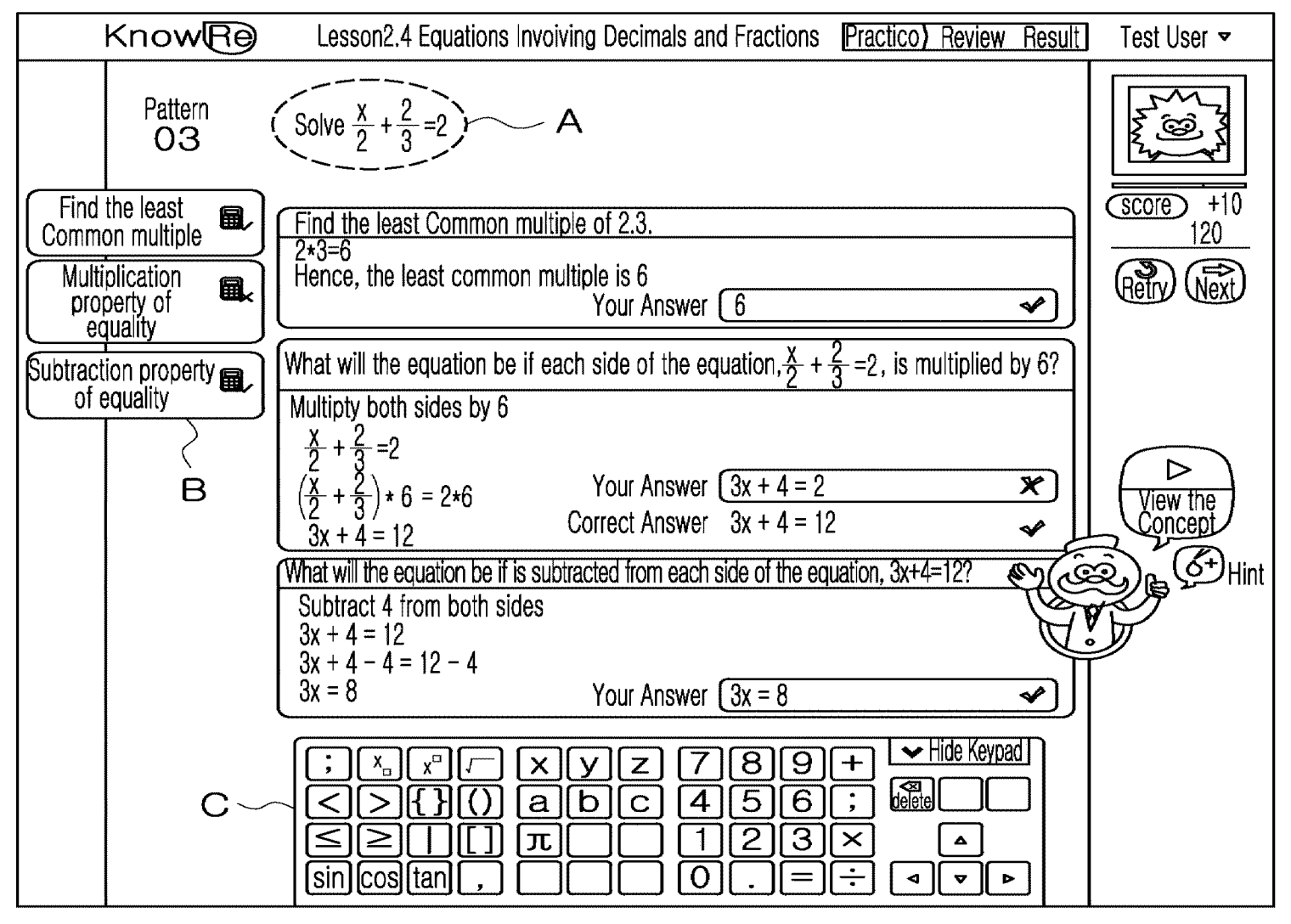

Next, the knowledge providing unit 220 according to one embodiment of the present invention may provide a user with the problems according to a specific curriculum, and as necessary, provide the user with the problem items, correct answers, explanations, hints, or the like of individual solution steps, or the correct answers to the problems themselves. In particular, the knowledge providing unit 220 may provide contents on the knowledge units associated with the answers of the individual solution steps that the user provides as feedback in response to the problems. This will be further described below with reference to FIG. 4. FIG. 4 illustrates a graphic user interface according to one embodiment of the present invention.

As illustrated in FIG. 4, the knowledge providing unit 220 may provide the user with Problem A and allow the user to solve the problem item (i.e., sub-problem) provided in each of the solution steps of Problem A.

First, the knowledge providing unit 220 may provide the user with a first sub-problem that asks the user to find the least common multiple of 2 and 3. When the user solves the first sub-problem and enters '6' as the answer, the knowledge providing unit 220 confirms that it is the correct answer to the first sub-problem. In this case, the knowledge providing unit 220 may provide an indication that the user did not make an error in connection with the knowledge unit on "finding a least common multiple" through the knowledge unit display interface B on the left hand side.

Then, the knowledge providing unit 220 may provide a second sub-problem that asks the user to turn the equation of Problem A into a form that can be solved more easily. When the user solves the second sub-problem and enters "3x+4=2" as the answer, the knowledge providing unit 220 confirms that it is not the correct answer to the second sub-problem. In this case, the knowledge providing unit 220 may provide an indication that the user made an error in connection with the knowledge unit on "multiplying both sides of the equation by the same number" through the knowledge unit display interface B.

Next, the knowledge providing unit 220 may provide the user with a third sub-problem that asks the user to leave only the term containing the unknown on the left hand side of the equation which would have been the correct answer to the second sub-problem. When the user solves the third sub-problem and enters "3x=8" as the answer, the knowledge providing unit 220 may confirm that it is the correct answer to the third sub-problem. In this case, the knowledge providing unit 220 may provide an indication that the user did not make an error in connection with the knowledge unit on "subtracting the same number from both sides of the equation" through the knowledge unit display interface B.

Lastly, the knowledge providing unit 220 may provide the user with a fourth sub-problem (not shown) that asks the user to finally solve the equation which was the correct answer to the third sub-problem. When the user solves the fourth sub-problem and enters '8/3' as the answer, the knowledge providing unit 220 confirms that it is the correct answer to the fourth sub-problem and Problem A. In this case, the knowledge providing unit 220 may provide an indication that the user did not make an error at this time in connection with the knowledge unit on "multiplying both sides of the equation by the same number" (not shown) through the knowledge unit display interface B.

Meanwhile, if the user terminal device 300 is a smartphone or the like, the user may use a mobile key interface C as shown in the drawing in such cases as the user needs to enter his or her answers (of course, the mobile key interface C may be replaced by any known mathematical formula recognition (input) interface).

Next, the user knowledge analysis unit 230 may analyze the correctness of the user's answers each time the user enters the answers to the problems or sub-problems, and determine the user's achievements for the individual knowledge units of the corresponding problems or sub-problems.

Consider the case where the user enters answers only to problems. If the user enters a correct answer to a first problem, the user knowledge analysis unit 230 may assign a score indicating one success in one attempt (e.g. 1/1) to the user and each of the knowledge units K1, K2 and K4 constituting the first problem. Next, if the same user enters a wrong answer to a second problem sequentially constituted by K1, K2, K3, K4 and K5, and the wrong answer is determined to result from the user's insufficient understanding of the knowledge unit K4, then the user knowledge analysis unit 230 may assign a score indicating two successes in two attempts (e.g. 2/2) to the user and each of the knowledge units K1 and K2, a score indicating one success in one attempt (e.g. 1/1) to the user and the knowledge unit K3, and a score indicating one success in two attempts (e.g. 1/2) to the user and the knowledge unit K4. In this case, a score may or may not be assigned to the knowledge unit K5.

Meanwhile, it is apparent and needs no further illustration that if the user enters answers to sub-problems, some scores may be assigned to the user and the knowledge units corresponding to the sub-problems.

The user knowledge analysis unit 230 may analyze the user's achievements for the corresponding knowledge units more accurately as the user solves more problems of the same or similar types. Accordingly, the curriculum generation unit 210 may generate effective curriculums as described above.

Meanwhile, not only based on the correctness of the user's answers to the problems or sub-problems, but the user knowledge analysis unit 230 may also determine the user's achievements for the corresponding knowledge units differently, based on the amount of time that the user spent in solving the problems or sub-problems (e.g., the amount of time between when a problem is first displayed to the user and when the user enters the answer to the problem) and/or the number of hints that the user used to solve the problems or sub-problems. For example, the larger the amount of time that the user spent in solving a problem or sub-problem, or the more the hints that the user used to solve the problem or sub-problem, the lower the user's achievements for the corresponding knowledge units may be determined relatively.

Further, supposing that a user's achievement for a specific knowledge unit is reduced over time, the user knowledge analysis unit 230 may update the user's achievement accordingly. For example, if a user solves five problems associated with a certain knowledge unit and gets all the answers right, the user's achievement for that knowledge unit may be 5/5 for the moment. However, the user knowledge analysis unit 230 may adjust the value of the user's achievement to 5/5×(1−0.1×1) after one year. The formula used by the user knowledge analysis 230 may be generalized, for example, to "achievement×(1−reduction coefficient×time period (in years) elapsed from determination of achievement)." Meanwhile, the reduction coefficient used in the above formula may be determined according to a known memory loss curve.

Next, the database 240 according to one embodiment of the present invention may store the following: a large number of knowledge units (preferably a large number of organized knowledge units); a large number of problems from which a curriculum may be generated; sub-problems for such problems; correct answers to respective problems or sub-problems; explanations and hints on individual solution steps; information on each user's achievements for individual knowledge units; and so on.

Although FIG. 3 shows that the database 240 is configured to belong to the education service providing system 200, the database 240 may be configured separately from the education service providing system 200, as needed by those skilled in the art to implement the present invention. Meanwhile, the database 240 according to present invention encompasses a computer-readable recording medium, and may refer not only to a database in a narrow sense but also to a database in a broad sense including data records based on a file system or the like. The database 240 according to the present invention may be even a collection of simple logs if one can search and retrieve data from the collection.

Next, the communication unit 250 according to one embodiment of the present invention may operate to enable data reception and transmission from/to the curriculum generation unit 210, the knowledge providing unit 220, the user knowledge analysis unit 230, and the database 240.

Lastly, the control unit 260 according to one embodiment of the present invention may operate to control data flow among the curriculum generation unit 210, the knowledge providing unit 220, the user knowledge analysis unit 230, the database 240, and the communication unit 250. That is, the control unit 260 according to the present invention may control data flow into/out of the education service providing system 200 or data flow among the components of the education service providing system 200, such that the curriculum generation unit 210, the knowledge providing unit 220, the user knowledge analysis unit 230, the database 240, and the communication unit 250 may carry out their particular functions, respectively.

Curriculum Optimization

Figure 5A:
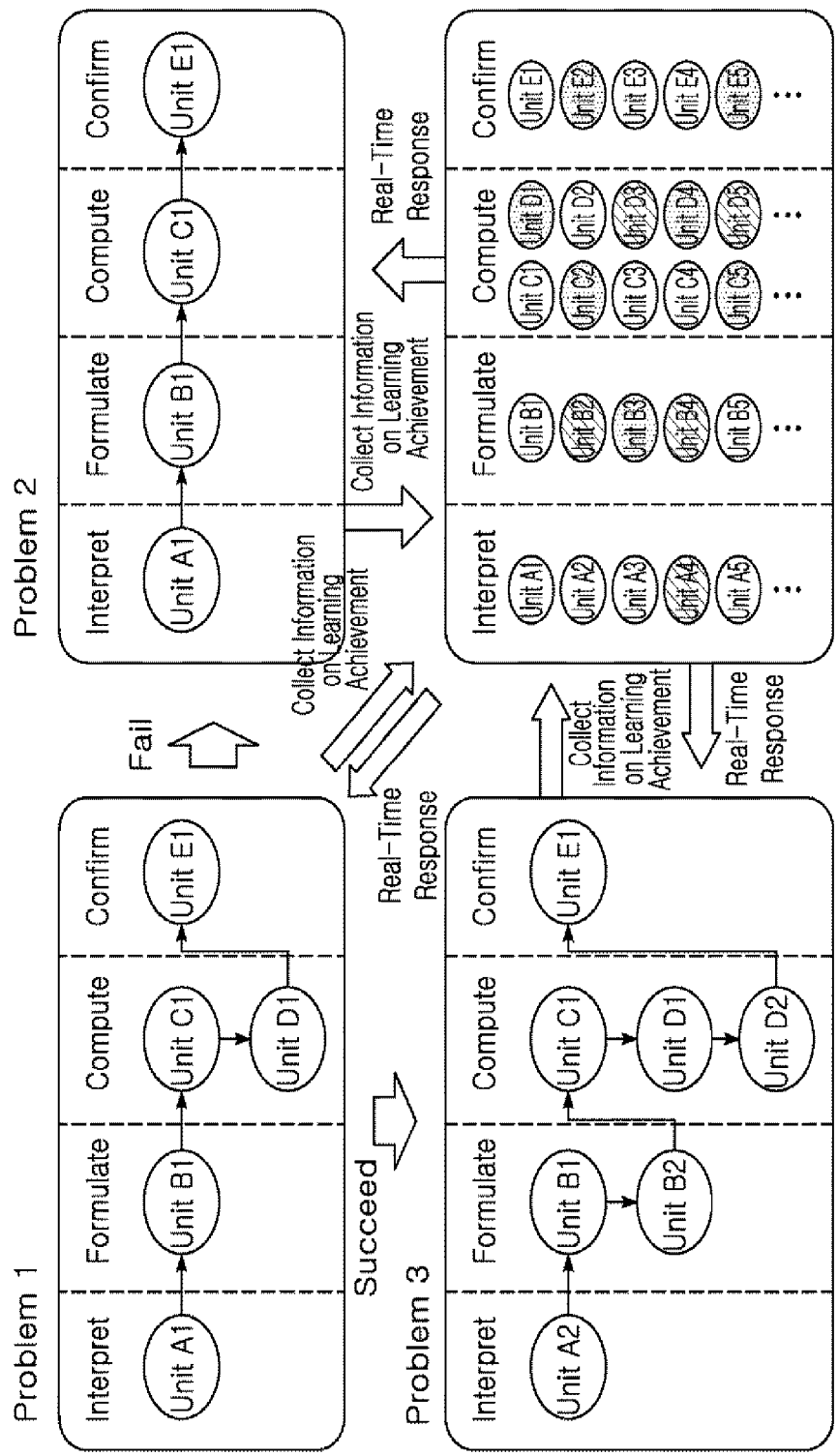
FIGS. 5a and 5b illustrate the procedures to optimize (generate) a curriculum for a specific user according to one embodiment of the present invention.
Figure 5B:
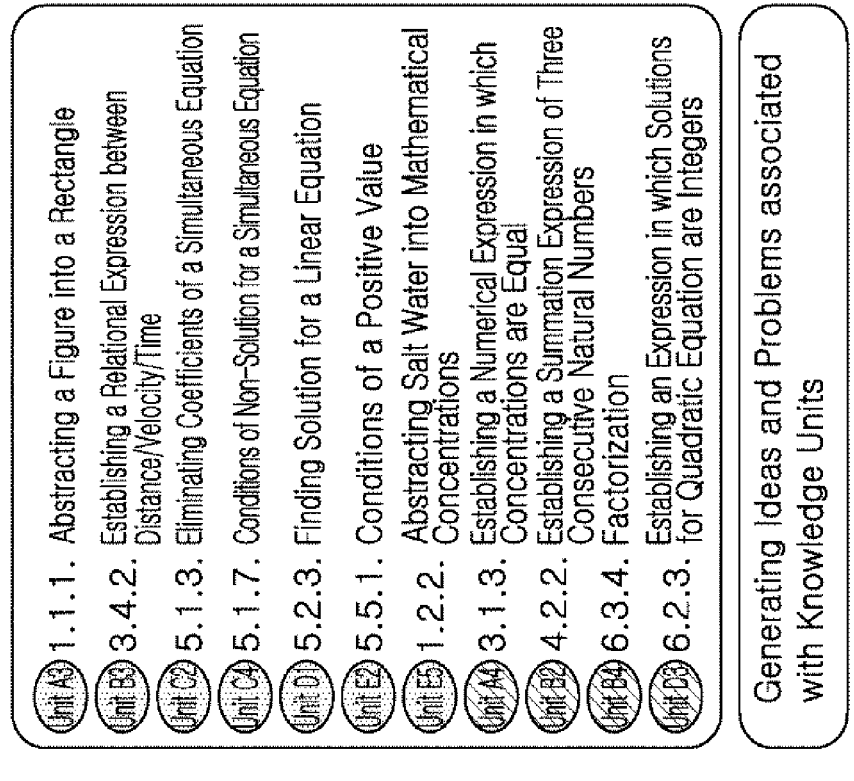
Figure 5B:
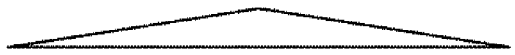
Figure 5B:
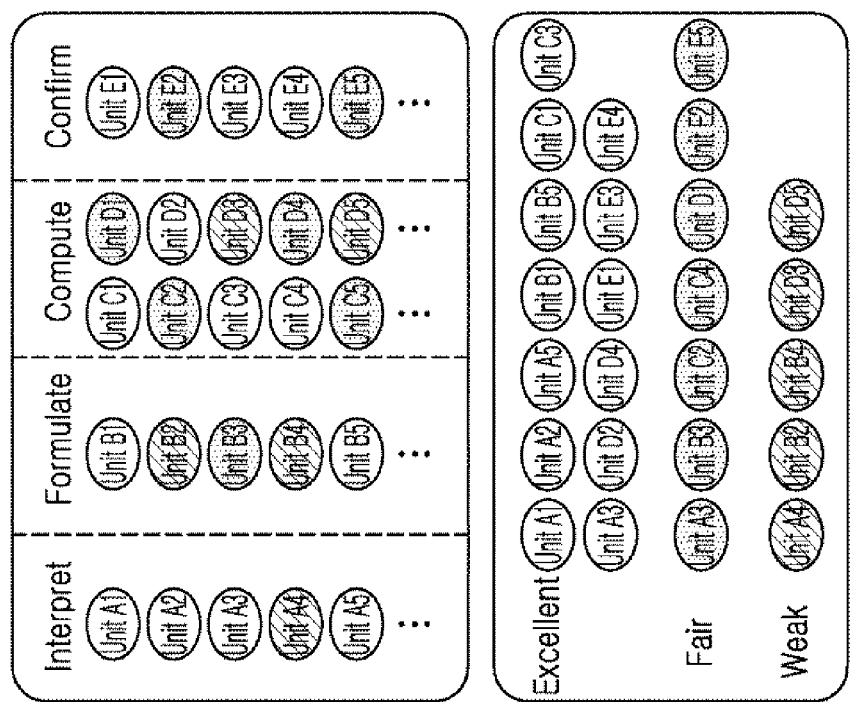
Figure 5C:
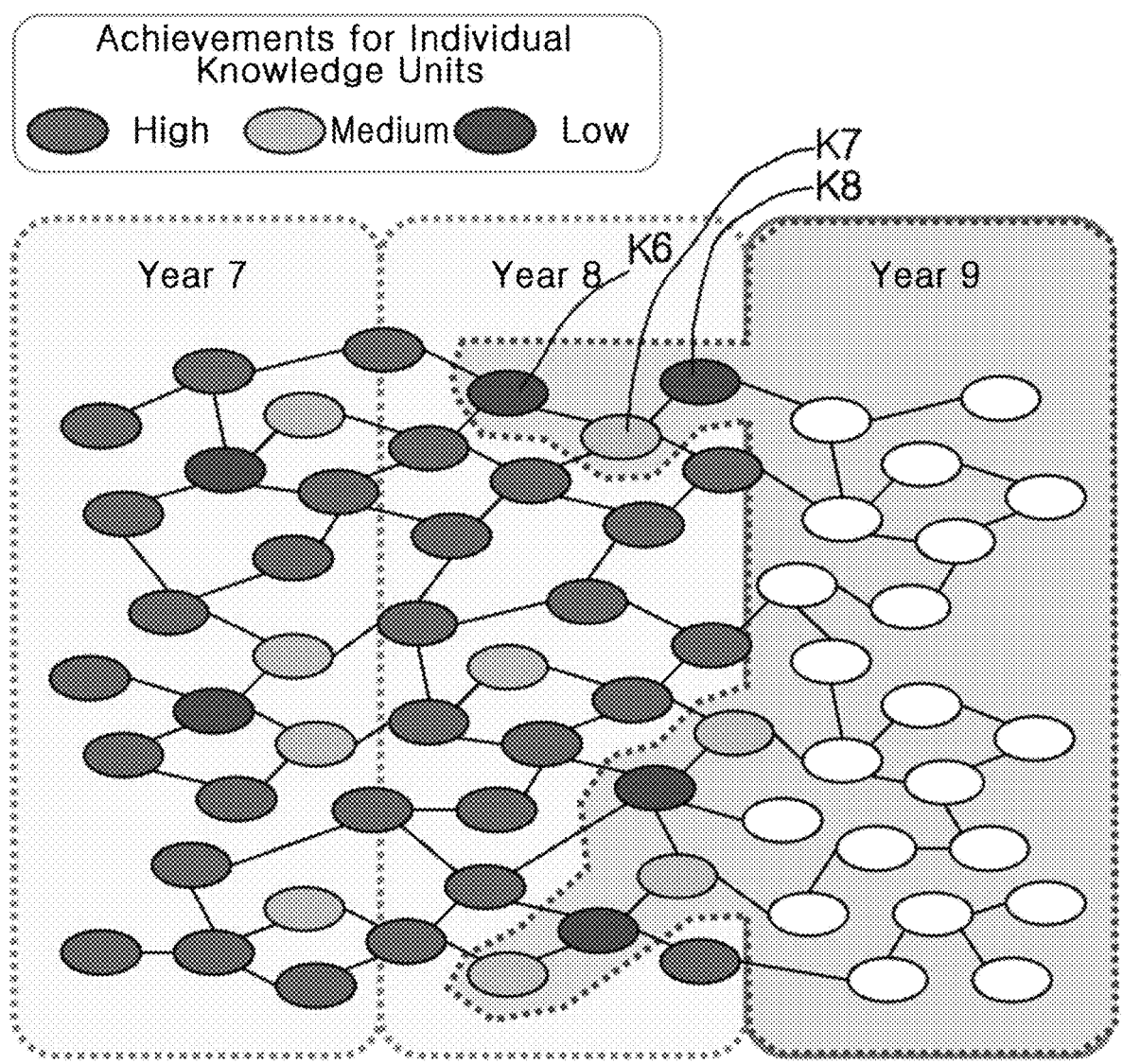
FIG. 5c illustrates an exemplary achievement matrix of the specific user for individual knowledge units, which is identified for the curriculum optimization.
Figure 6A:
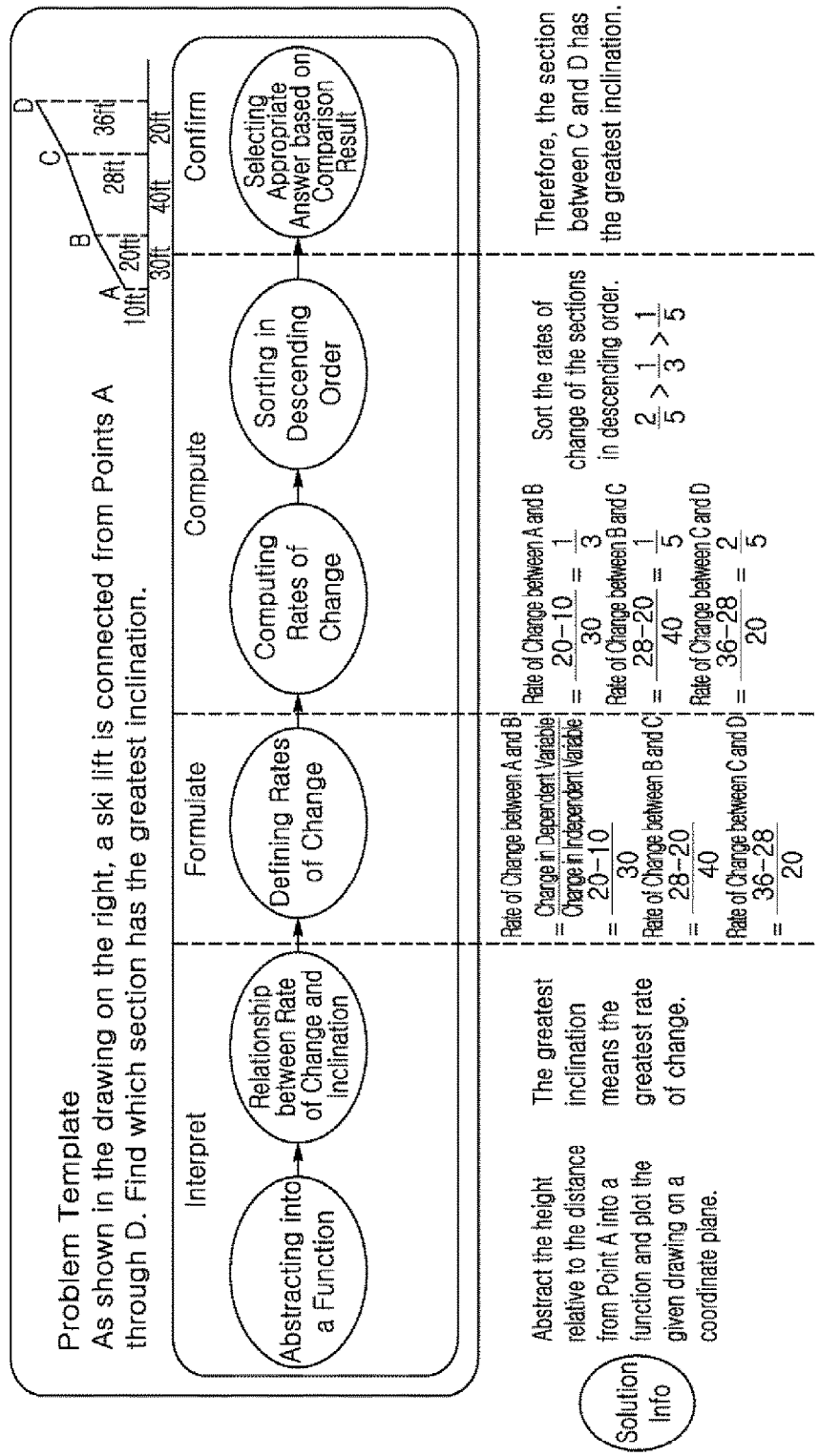
Figure 6B:
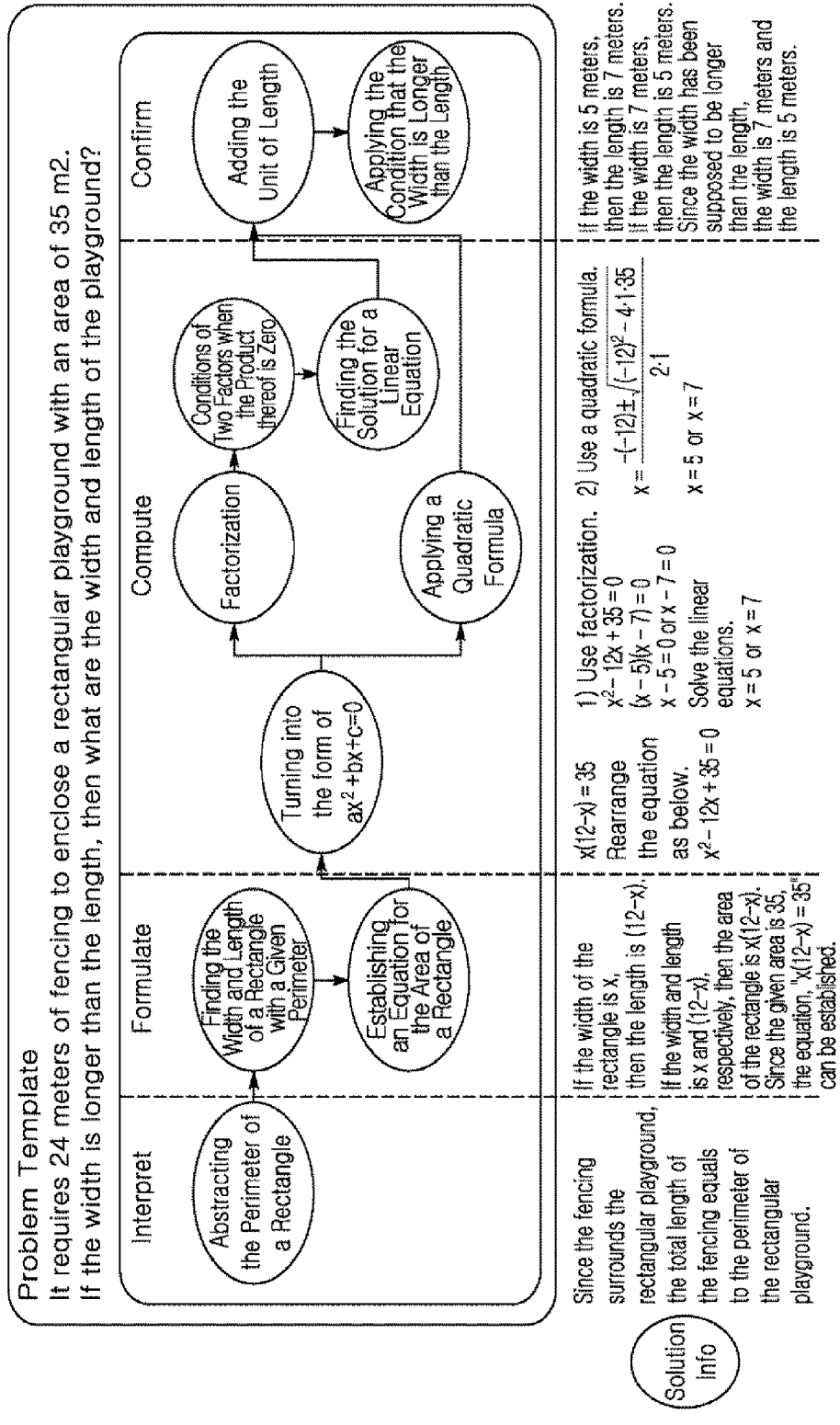
Figure 6C:
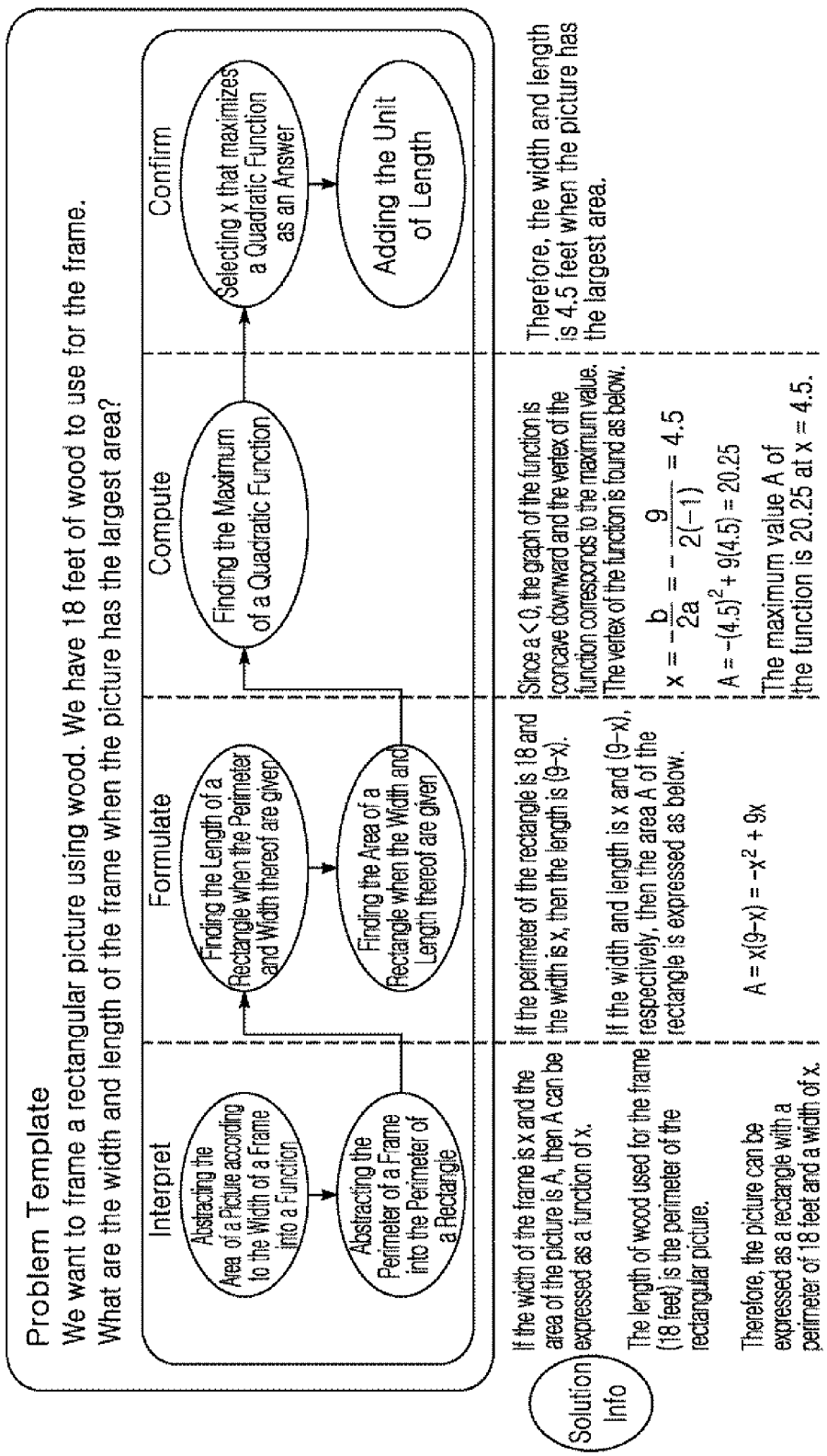
Figure 6D:
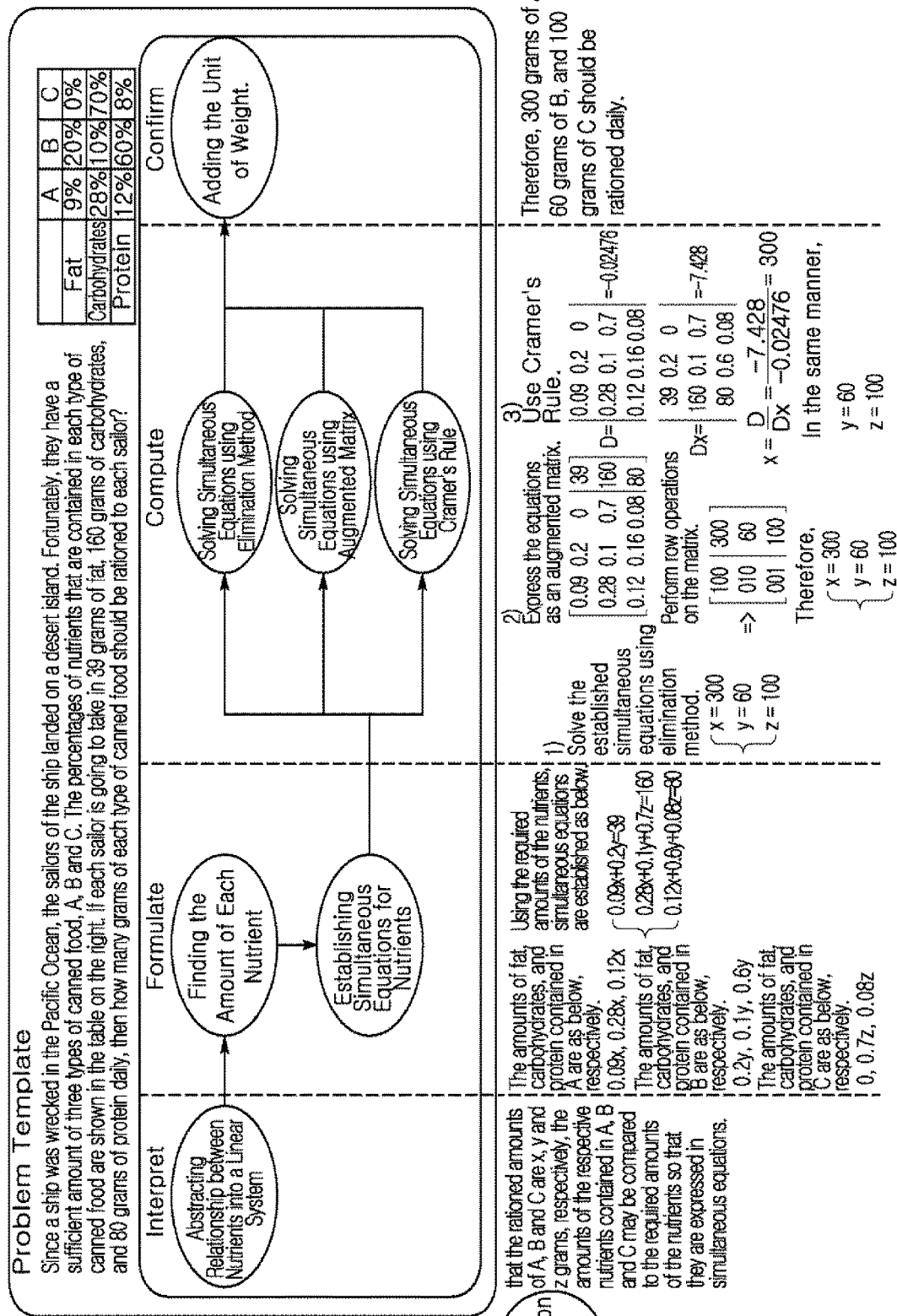
Figure 6E:
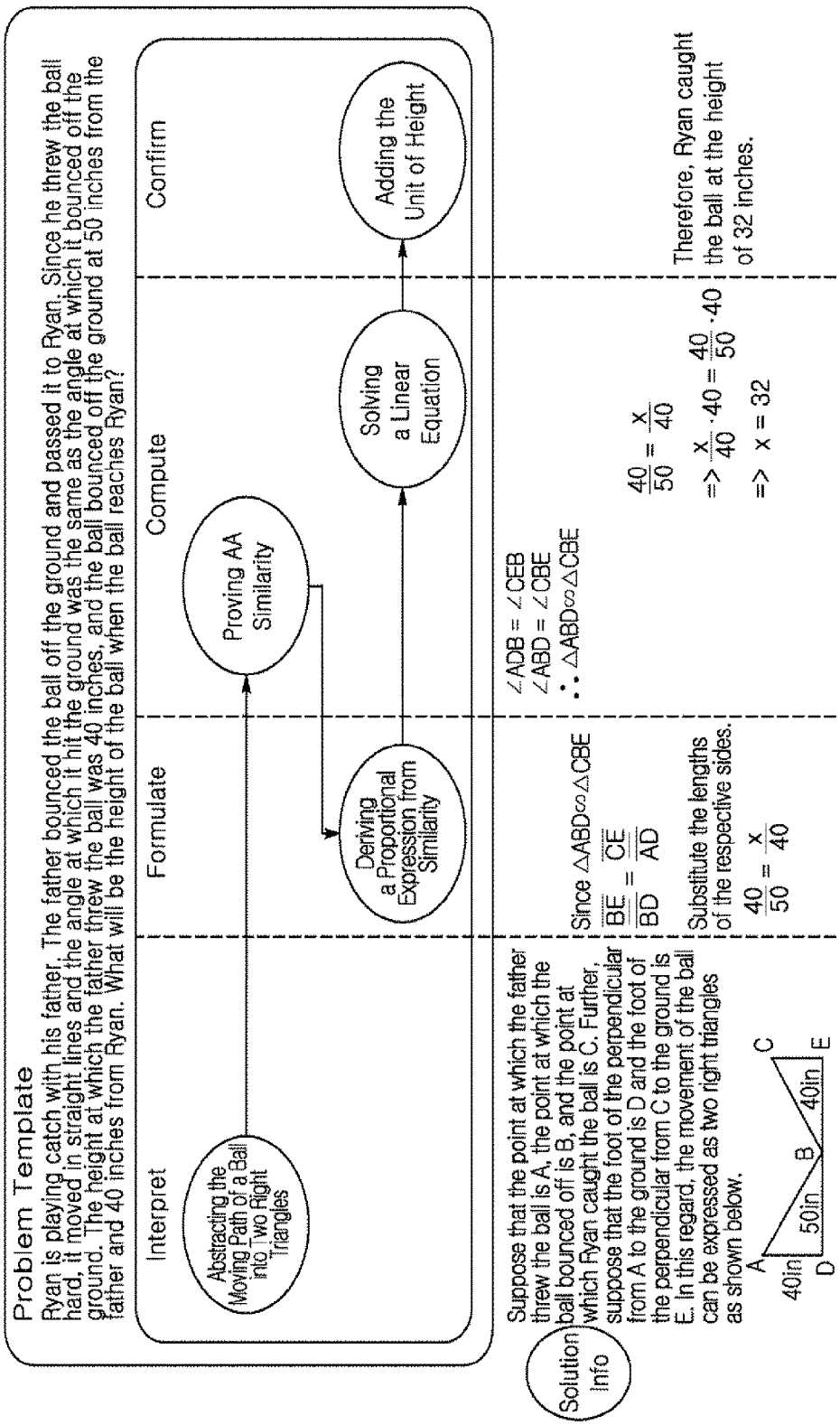
Figure 6F:
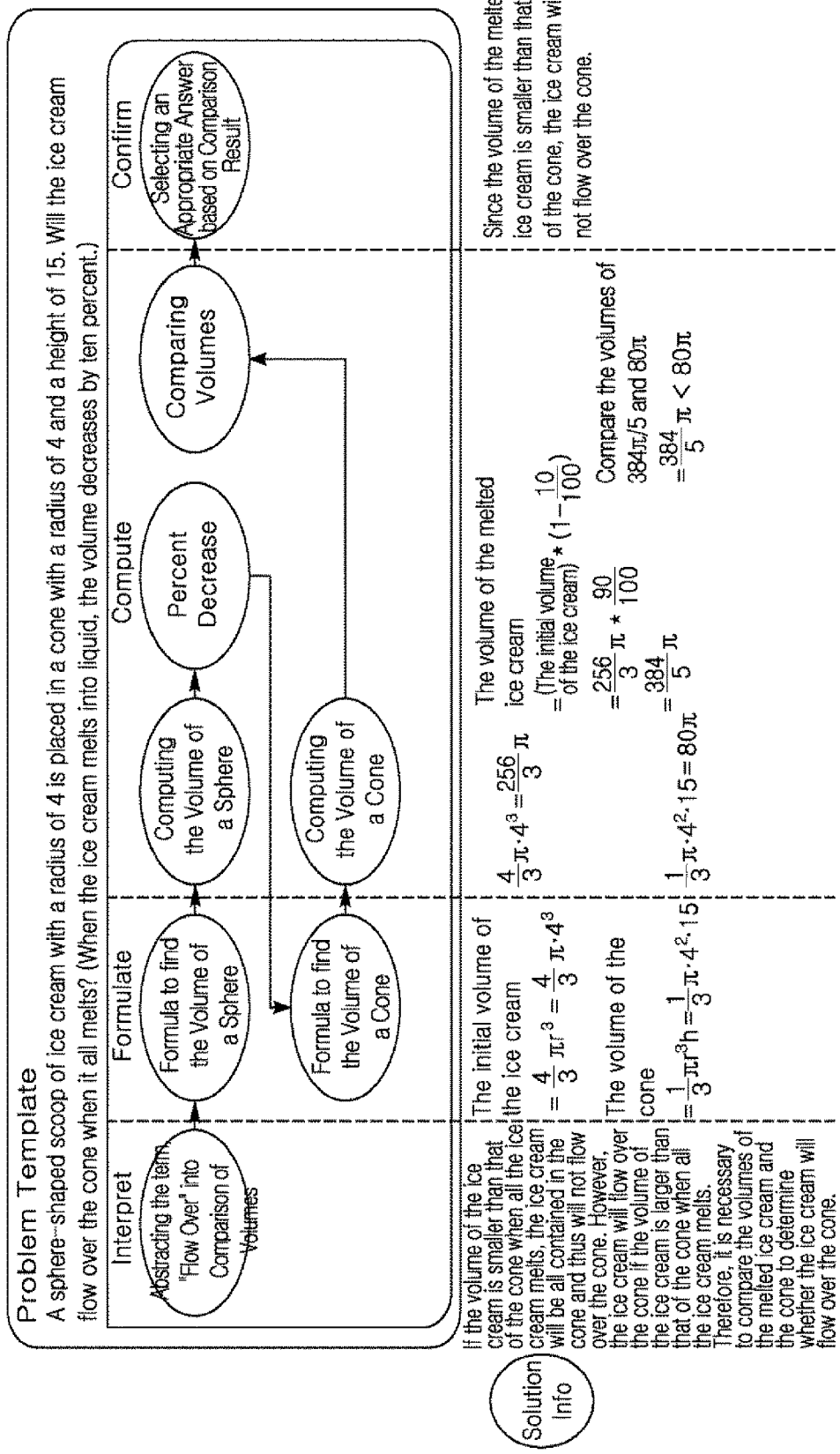
Figure 6G:
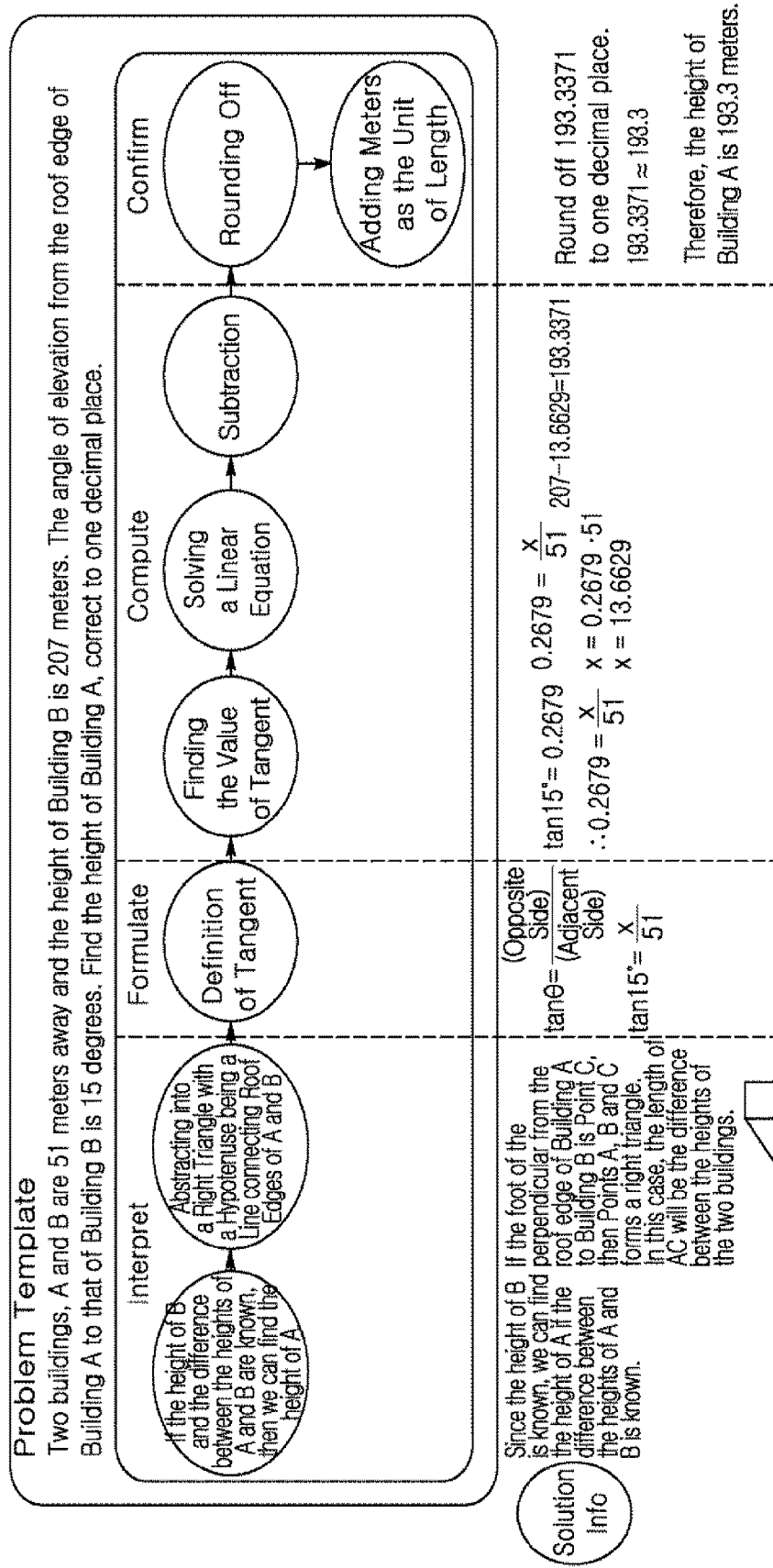
Figure 6H:
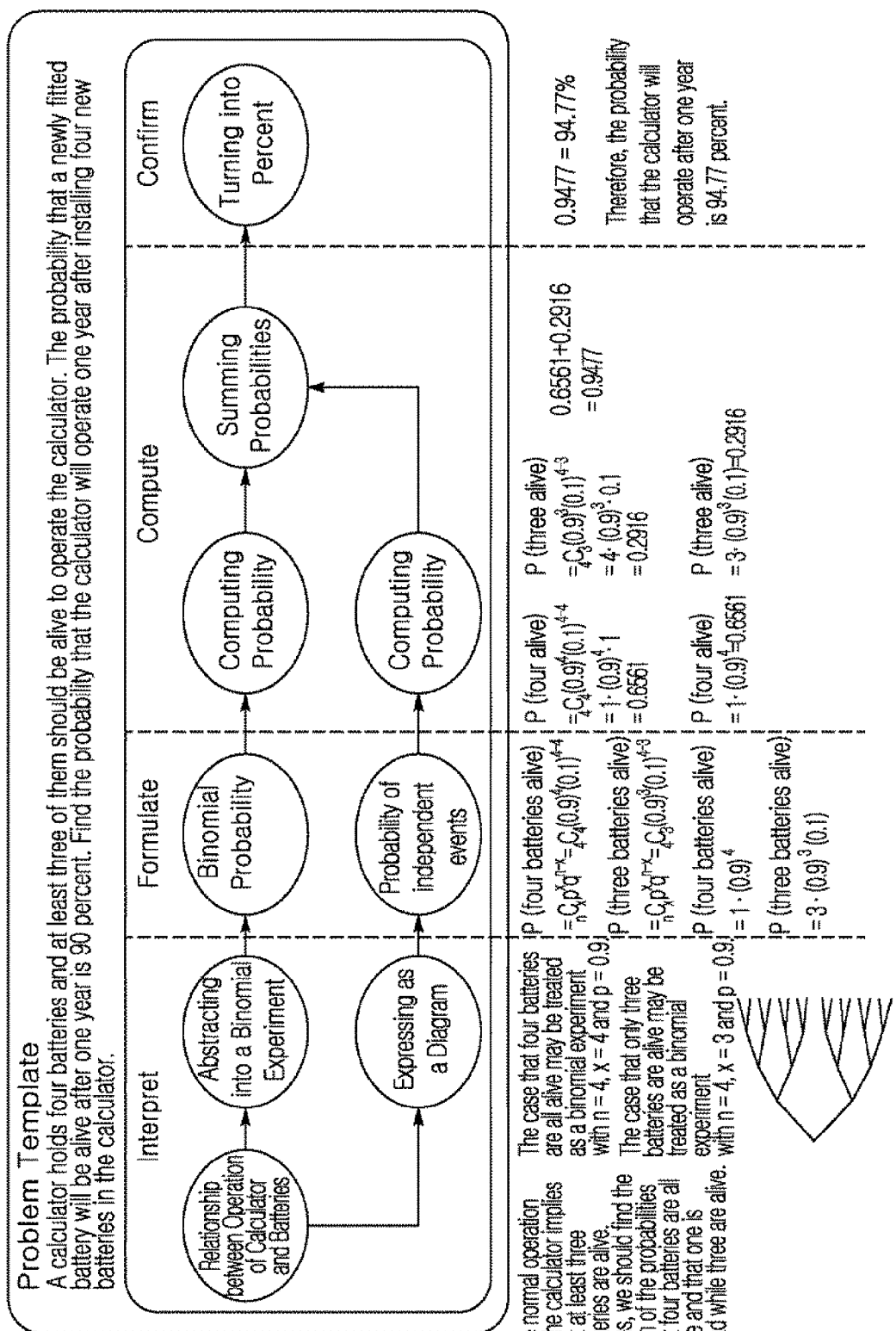
Figure 6I:
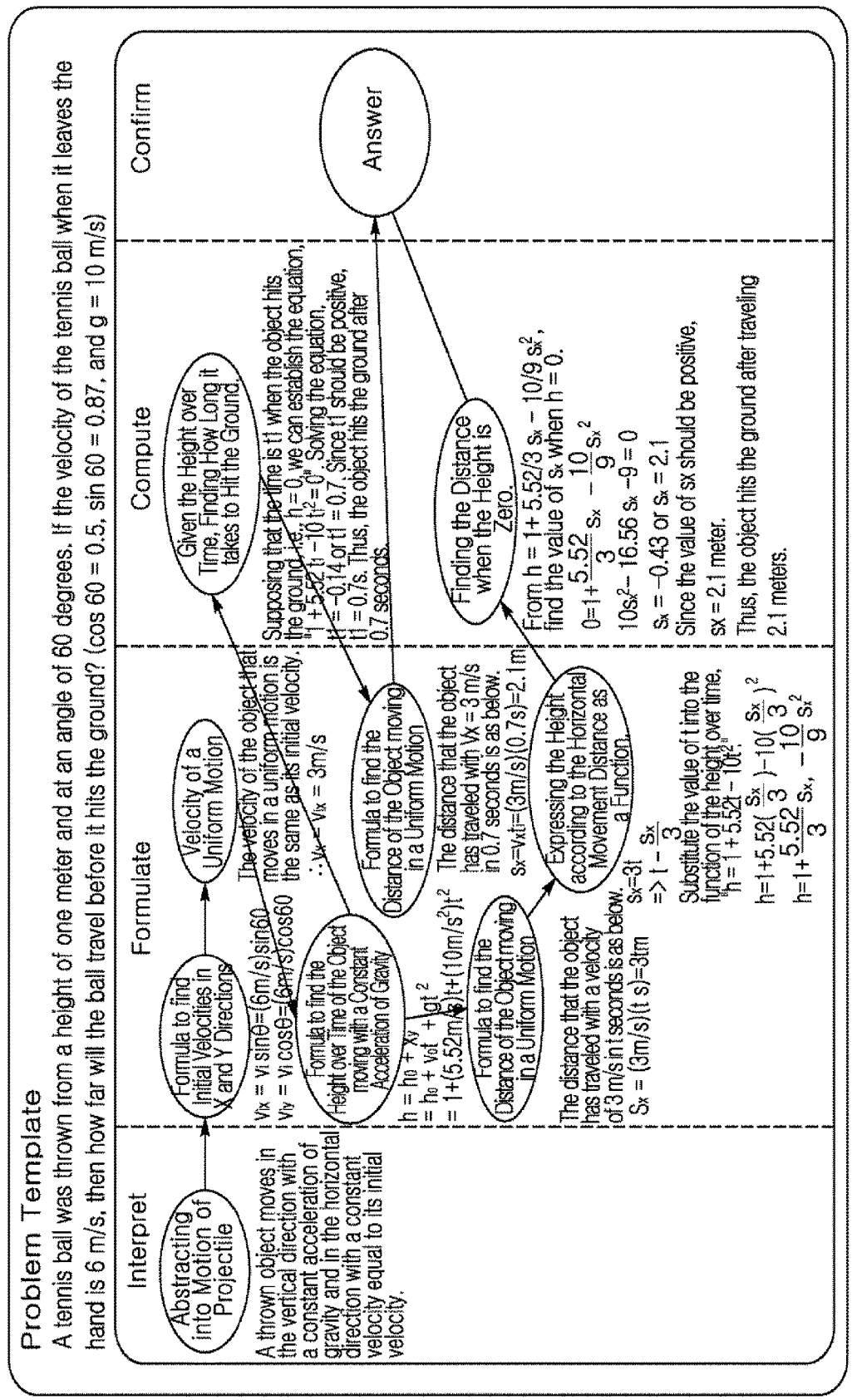
Figure 6J:
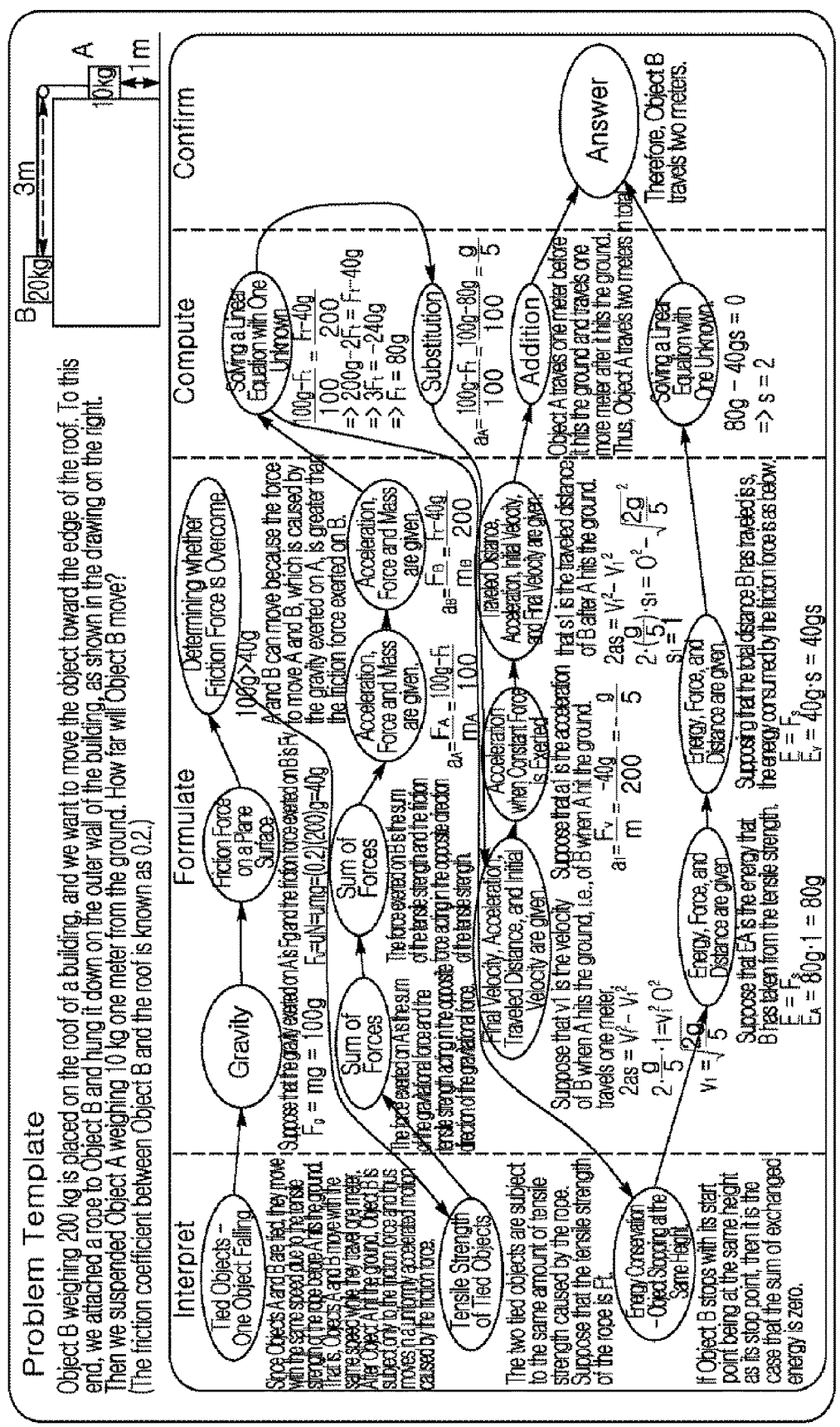
Figure 6K:
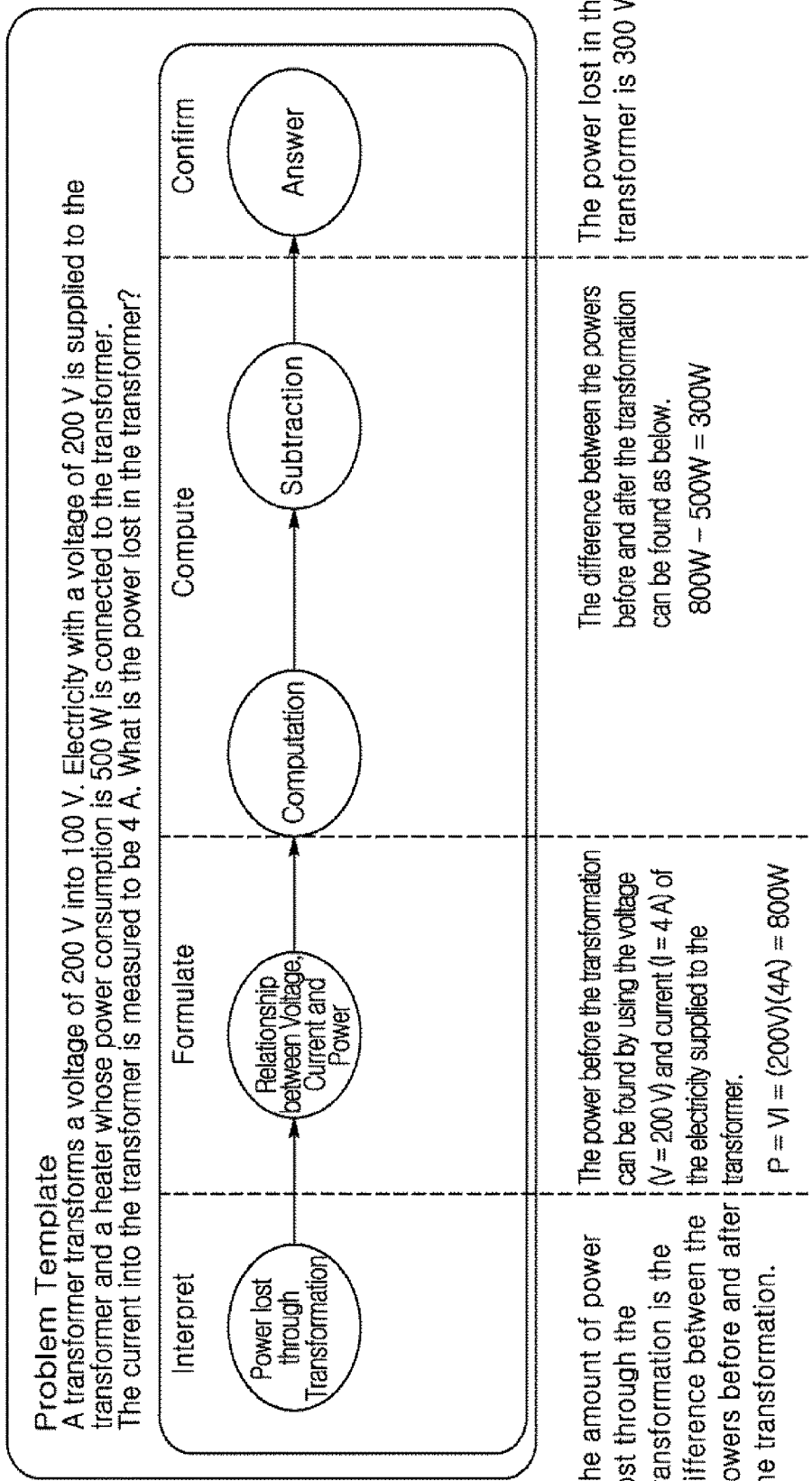

FIGS. 5a and 5b illustrate the procedures to optimize (generate) a curriculum for a specific user according to one embodiment of the present invention. FIG. 5c illustrates an exemplary achievement matrix of the specific user for individual knowledge units, which is identified for the curriculum optimization. Referring to FIGS. 5a to 5c, the curriculum optimization according to one embodiment of the present invention will be discussed below. Meanwhile, in FIGS. 5a to 5c, the symbols in blue represent the knowledge units for which the user shows high achievement, the symbols in yellow represent the knowledge units for which the user shows medium achievement, and the symbols in red represent the knowledge units for which the user shows low achievement.

In the following description, we assume that the learning course for which the curriculum optimization is carried out is mathematics.

The curriculum optimization results in generating a collection of problems suitable for learning, preferably with reference to information on the user's grade or the learning unit, so as to enable the user's intensive and phased learning about the knowledge units for which the user has shown low or medium achievement.

Referring to FIG. 5a, the user may solve a first problem composed based on Units (i.e., Knowledge Units) A1 to E1, which belong to one of the four solution steps including problem interpretation, formulation, computation, and answer confirmation (for details on the above solution steps, see the present inventor's Korean Patent Application No. 2009-36153.) If the user fails to get the correct answer to the first problem due to the lack of understanding of Unit D1, the user knowledge analysis unit 230 may reflect the information on the achievements for the individual knowledge units to the database 240 in real time, which indicates that the user has a good understanding of Units A1 to C1 but lacks understanding of Unit D1. The user may then solve a second problem composed based on the units except Unit D1 (i.e., Units A1 to C1 and E1). If the user gets the correct answer to the second problem, the information on the achievements for the individual knowledge units, which indicates that the user has a good understanding of Units A1 to C1 and E1, may be reflected to the database. Meanwhile, after getting the correct answer to the first problem, the user may solve a third problem composed based on more number of knowledge units. In accordance with the result, the information indicating that, for example, the user has shown medium achievement for Unit D1 and low achievement for Unit B2 may be reflected. After going through the above procedures several times, the curriculum generation unit 210 may generate an optimized curriculum as shown in FIG. 5b and provide it to the user.

Meanwhile, for example, in order to evaluate a user's achievements for individual knowledge units, the user being currently an eight-year student and planning to learn ninth year courses preliminarily, an achievement matrix for the individual knowledge units may be generated as shown in FIG. 5c by asking the user to solve various types of problems. As it may be seen from the achievement matrix for the individual knowledge units, the user needs to overcome the low achievement for the knowledge units such as K7 and K8 as well as the medium achievement for the knowledge units such as K7 in order to learn the ninth year courses preliminarily because the above-mentioned knowledge units are considered to be fundamental to (i.e., associated with the knowledge units for) the preliminary learning.

As such, the achievement matrix for the individual knowledge units is significantly useful for the curriculum generation unit 210 to identify, with respect to a specific user, the case where the achievements for various knowledge units which are closely associated with each other are generally low or medium, or the case where the knowledge units of the learning units (or grade courses) for which the user has finished learning and shown low or medium achievement are associated with those required for preliminary learning. Therefore, the curriculum generation unit 210 may generate an optimized curriculum with reference to the aforementioned achievement matrix for individual knowledge units.

Figure 7:
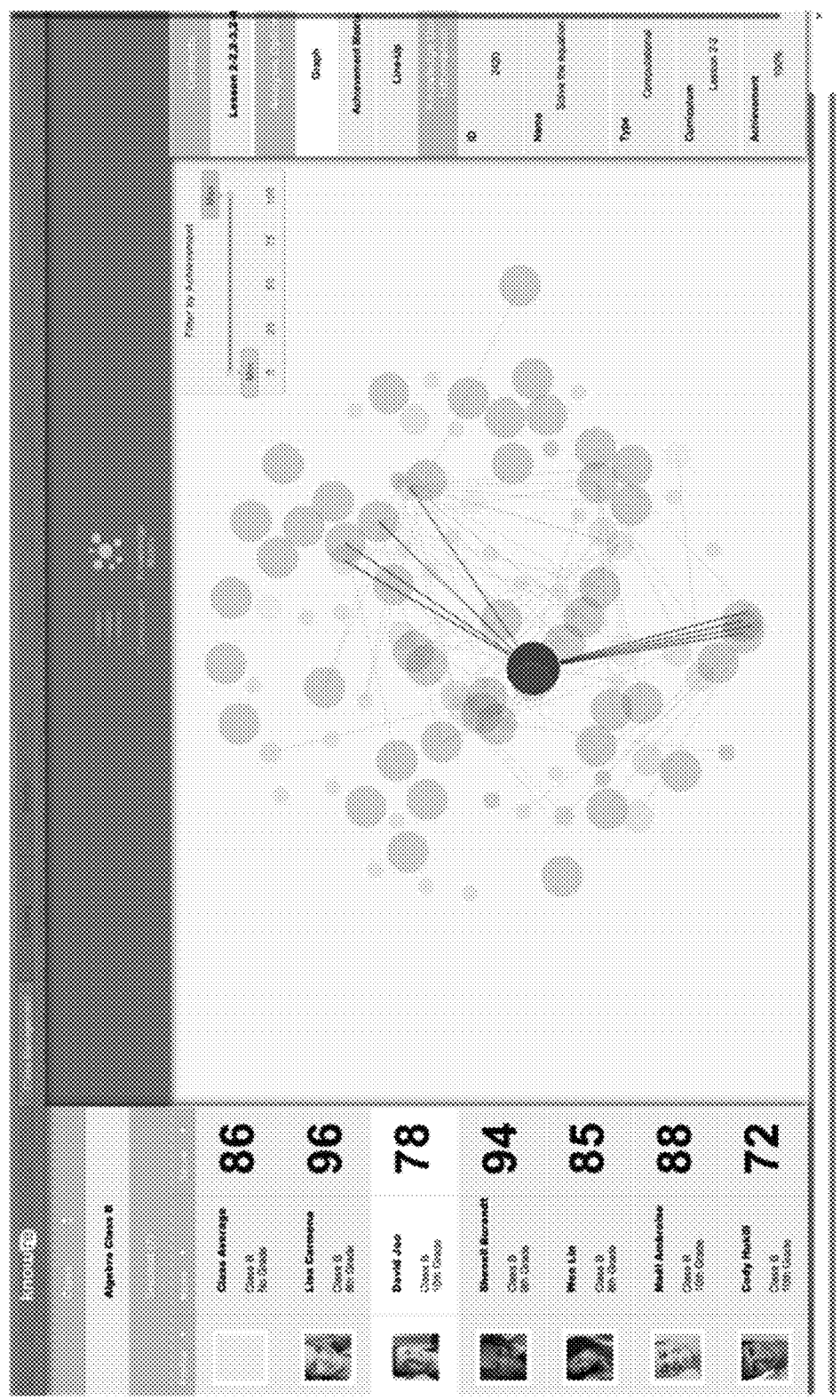
FIG. 7 shows another example of the user achievement matrix according to the present invention.

FIG. 7 shows another example of the user achievement matrix according to the present invention. As shown in FIG. 7, the user's achievements for individual knowledge units may be represented by a three-dimensional achievement matrix. In this achievement matrix, the larger circles in blue indicate the knowledge units for which the user has shown high achievement and the smaller circles in other colors indicate the knowledge units for which the user has not shown high achievement. Further, the associative relationship between the individual knowledge units may be determined, for example, based on the number of knowledge chains to which the knowledge units belong together, and may be represented by the connection of lines.

Examples of Knowledge Chains

According to one embodiment of the present invention, the database 240 may store a significantly large number of knowledge chains (which may be referred to as problem templates.) The knowledge chains may be stored in association with one or more knowledge units, problems (practice problems), explanations on individual solution steps, or the like as described above. FIGS. 6a to 6l are textual representations illustrating exemplary knowledge chains of mathematics or science courses and their corresponding knowledge units, problems, explanations on individual solution steps, or the like. It is apparent that the database 240 may store numerous knowledge chains and corresponding knowledge units other than illustrated in FIGS. 6a to 6l, as desired by those skilled in the art who implement the database 240.

The embodiments according to the present invention as described above may be implemented in the form of program instructions that can be executed by various computer components, and may be stored on a computer-readable recording medium. The computer-readable recording medium may include program instructions, data files, data structures, and the like separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks, and magnetic tapes; optical media such as compact disk-read only memory (CD-ROM) and digital versatile disks (DVDs); magneto-optical media such as floptical disks; and hardware devices such as read-only memory (ROM), random access memory (RAM), and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described above in connection with specific limitations such as detailed components as well as limited embodiments and drawings, these are merely provided to aid general understanding of the invention. The present invention is not limited to the above embodiments, and those skilled in the art will appreciate that various changes and modifications are possible from the above description.

Therefore, the spirit and scope of the present invention is not to be limited by the above-described embodiments, but rather is to be defined by the accompanying claims and equivalents thereof.

What is claimed is:

1. A system for providing education service based on knowledge units, the system comprising:
    a database configured to store a three-dimensional matrix of knowledge units formed such that each node of the matrix of knowledge units corresponds to each of the knowledge units and represents a user's achievement for the corresponding knowledge unit, the matrix of knowledge units including a first knowledge chain and a second knowledge chain;
    a curriculum generation unit configured to generate a curriculum for the user based on the matrix of knowledge units stored in the database, wherein the knowledge units include at least one of an interpretative knowledge unit, a formulaic knowledge unit, and a computational knowledge unit, and the curriculum includes at least one problem composed based on at least one knowledge unit of the knowledge units;
    a knowledge providing unit configured to provide the user with the at least one problem via a user interface, and to provide the user with contents on the knowledge unit associated with the user's response to the at least one problem via the user interface, wherein the at least one problem is composed by the first knowledge chain comprised of the at least one knowledge unit and at least one other knowledge unit, and the first knowledge chain includes identification information of the at least one knowledge unit and the at least one other knowledge unit; and
    a user knowledge analysis unit configured to determine the user's achievement for the at least one knowledge unit based on a feedback that the user provided in response to at least one other problem composed by the first knowledge chain, and to reflect information on the user's achievement for the at least one knowledge unit to the database, wherein the at least one problem is assigned the identification information of the at least one knowledge unit and the at least one other knowledge unit in the form of metadata, wherein the at least one knowledge unit is organized with at least one yet other knowledge unit such that a link between the nodes corresponding to the at least one knowledge unit and the at least one yet other knowledge unit in the matrix of knowledge units represents an association between the at least one knowledge unit and the at least one yet other knowledge unit, and the association is identified when the at least one knowledge unit and the at least one yet other knowledge unit constitute the second knowledge chain, and wherein the user interface displays the three-dimensional matrix including a plurality of nodes corresponding to the knowledge units, respectively, and a plurality of links each connecting two nodes of the plurality of nodes, each of the nodes being presented at different three dimensional coordinates on a simulated three dimensional space of the user interface, and the user interface dynamically updates a size or color of one or more of the plurality of nodes presented on the user interface based on the user's achievement for corresponding one or more knowledge units.

2. The system of claim 1, wherein the feedback is an answer to the at least one other problem.

3. The system of claim 1, wherein the feedback is one of answers to individual solution steps for the at least one other problem.

4. The system of claim 1, wherein the user's achievement for the at least one knowledge unit is determined further based on an amount of time that the user spent for the feedback.

5. The system of claim 1, wherein the curriculum includes a plurality of problems, and each of the plurality of problems is composed based on the at least one knowledge unit.

6. The system of claim 1, wherein the curriculum generation unit generates the curriculum further based on grade information, learning course information, or learning unit information of the at least one knowledge unit, and wherein the curriculum generation unit generates the curriculum further based on a difficulty level of each of the at least one problem and the number of knowledge units constituting each of the at least one problem.

7. A non-transitory computer readable medium storing computer readable instructions which, when executed by a computer system, perform a method for providing education service based on knowledge units, the method comprising:

generating a curriculum for a user based on a three-dimensional matrix of knowledge units stored in a database and formed such that each node of the matrix of knowledge units corresponds to each of the knowledge units and represents the user's achievement for the corresponding knowledge unit, the matrix of knowledge units including a first knowledge chain and a second knowledge chain, wherein the knowledge units include at least one of an interpretative knowledge unit, a formulaic knowledge unit and a computational knowledge unit, and the curriculum includes at least one problem composed based on at least one knowledge unit of the knowledge units;

providing the user with the at least one problem via a user interface, and providing the user with contents on the knowledge unit associated with the user's response to the at least one problem via the user interface, wherein the at least one problem is composed by the first knowledge chain comprised of the at least one knowledge unit and at least one other knowledge unit, and the first knowledge chain includes identification information of the at least one knowledge unit and the at least one other knowledge unit;

determining the user's achievement for the at least one knowledge unit based on a feedback that the user provided in response to at least one other problem composed by the first knowledge chain, and reflecting information on the user's achievement for the at least one knowledge unit to the database;

displaying, on the user interface, the three-dimensional matrix including a plurality of nodes corresponding to the knowledge units, respectively, and a plurality of links each connecting two nodes of the plurality of nodes, each of the nodes being presented at different three dimensional coordinates on a simulated three dimensional space of the user interface; and dynamically updating a size or color of one or more of the plurality of nodes presented on the user interface based on the user's achievement for corresponding one or more knowledge units, wherein the at least one problem is assigned the identification information of the at least one knowledge unit and the at least one other knowledge unit in the form of metadata, and wherein the at least one knowledge unit is organized with at least one yet other knowledge unit such that a link between the nodes corresponding to the at least one knowledge unit and the at least one yet other knowledge unit in the matrix of knowledge units represents an association between the at least one knowledge unit and the at least one yet other knowledge unit, and the association is identified when the at least one knowledge unit and the at least one yet other knowledge unit constitute the second knowledge chain.

8. The non-transitory computer readable medium of claim 7, wherein the feedback is an answer to the at least one other problem.

9. The non-transitory computer readable medium of claim 7, wherein the feedback is one of answers to individual solution steps for the at least one other problem.

10. The non-transitory computer readable medium of claim 7, wherein the user's achievement for the at least one knowledge unit is determined further based on an amount of time that the user spent for the feedback.

11. The non-transitory computer readable medium of claim 7, wherein the curriculum includes a plurality of problems, and each of the plurality of problems is composed based on the at least one knowledge unit.

12. The non-transitory computer readable medium of claim 7, wherein the method further comprises:

generating the curriculum further based on grade information, learning course information, or learning unit information of the at least one knowledge unit; and generating the curriculum further based on a difficulty level of each of the at least one problem and the number of knowledge units constituting each of the at least one problem.

13. The system of claim 1, wherein the user knowledge analysis unit is configured to adjust the user's achievement for the at least one knowledge unit based on a time period elapsed from a time of determination of the achievement for the at least one knowledge unit.

14. The non-transitory computer readable medium of claim 7, wherein the user's achievement for the at least one knowledge unit is adjusted based on a time period elapsed from a time of determination of the achievement for the at least one knowledge unit.

15. The system of claim 1, wherein the user's achievement for the at least one knowledge unit is determined further based on a number of hints that the user used for the feedback.

16. The non-transitory computer readable medium of claim 7, wherein the user's achievement for the at least one knowledge unit is determined further based on a number of hints that the user used for the feedback.

17. The system of claim 4, wherein the amount of time is a time amount between when the at least one other problem or an individual solution step for the at least one other problem is displayed to the user and when the user enters an answer to the at least one other problem or the individual solution step for the at least one other problem.

18. The non-transitory computer readable medium of claim 10, wherein the amount of time is a time amount between when the at least one other problem or an individual solution step for the at least one other problem is displayed to the user and when the user enters an answer to the at least one other problem or the individual solution step for the at least one other problem.

* * * * *